May 19, 1925.　　　　M. TAYLOR ET AL　　　1,538,308
RAT TRAP
Filed June 10, 1924
Fig. 1.
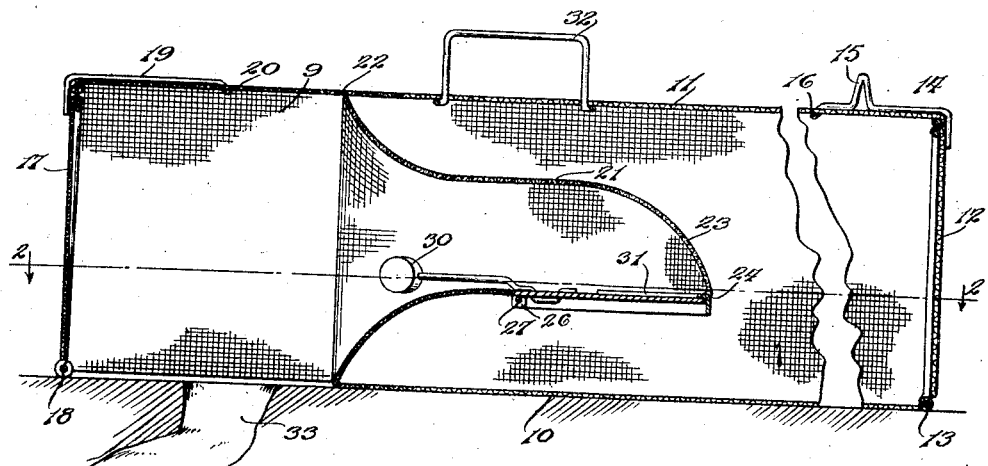
Fig. 2.
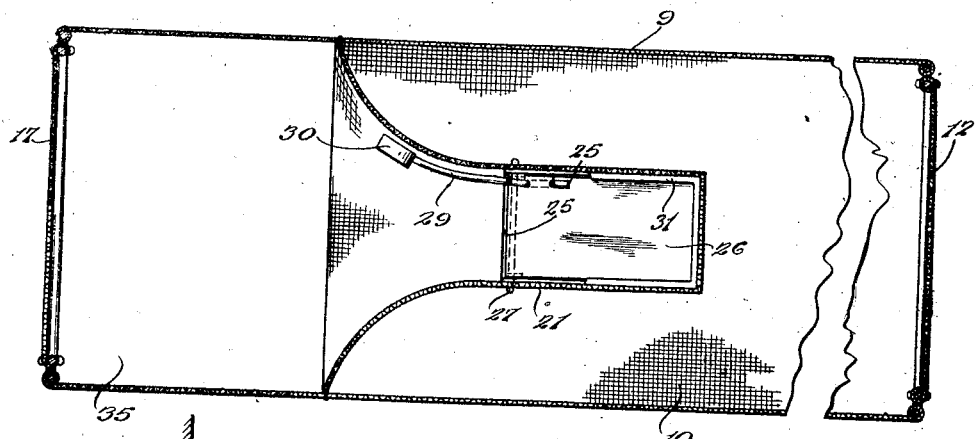
Fig. 3
Inventor
Mark Taylor
Hugh G. Soward
By Lacy & Lacy, Attorneys Patented May 19, 1925.

1,538,308

UNITED STATES PATENT OFFICE.

MARK TAYLOR AND HUGH G. SOWARD, OF CLEVELAND, TENNESSEE.

RAT TRAP.

Application filed June 10, 1924. Serial No. 719,148.

*To all whom it may concern:*

Be it known that we, MARK TAYLOR and HUGH G. SOWARD, citizens of the United States, residing at Cleveland, in the county of Bradley and State of Tennessee, have invented certain new and useful Improvements in Rat Traps, of which the following is a specification.

Our invention relates to a trap for catching rats and mice and one of the advantages of this trap is that no bait is required and that the same trap will catch both large and small rodents without any adjustment.

One object of the invention is to provide a trap which can be set over a rat hole in the ground or floor or against a wall or wherever a rat hole is found.

In the accompanying drawing, one embodiment of the invention is illustrated, and:

Figure 1 is a vertical longitudinal section of the trap.

Figure 2 is a section along line 2—2 of Figure 1.

Figure 3 is a fragmentary vertical section illustrating the trap positioned against a wall having a rat hole.

In the drawings, the reference numeral 9 indicates the sides of the trap body, 10 the bottom and 11 the top thereof. The trap is preferably made of wire but it is evident that other material, such as perforated plate, may also be used. The trap is rectangular in shape with substantially square cross section and at the forward end there is a door 12 which is hinged, as at 13, to swing down forwardly of the trap or be held in closed position by a wire latch 14 provided with a small handle 15 and hinged, as at 16, in the top 11 of the trap.

Similarly, the rear end of the trap is also provided with a door 17 hinged at the bottom as at 18, and adapted to be locked in upright position by hooks 19 pivoted as at 20, in the top 11 of the trap.

When the front and rear doors 12 and 17 are swung down, both ends of the trap are open but in the operation of the trap, the front door is swung to upright position in order to close the front end of the trap. The rear door 17, on the other hand, may close the rear opening of the trap, as indicated in Figure 1, when the trap is in use, or it may close an opening of the same size as the door in the bottom 10 when the trap is arranged in operative position as indicated in Figure 3, in which case, the rear end of the trap is open while the door 17 is swung under to form a continuation of the bottom 10 of the trap.

At about the forward edge of the bottom opening in the trap body is arranged a funnel 21 having its walls flared and firmly joined to the top, bottom and sides of the trap, as at 22, dividing the trap into front and rear compartments. This funnel projects to about the middle of the front compartment and is also made of the same material as the trap body; that is, in this particular case, as shown in the drawings, wire. The cross section of the funnel is considerably smaller than that of the trap body and the roof portion of the funnel is preferably curved downwardly, as at 23, to meet the bottom of the funnel at the point indicated by the numeral 24. From this point rearwardly is formed an exit opening 25 in the funnel bottom which is normally closed by a solid trap door 26 pivoted at its rear end by means of ears to a hinge rod secured near the bottom of the funnel, so that the forward end of the trap door will tip downwardly when a weight is placed thereon. A rearwardly extending arm 29 is secured in the trap door terminating in a weight 30 tending to hold the trap door 26 in closed position in contact with a ledge 31 formed on three sides of the exit opening 25 of the funnel, said door abutting the under side of the ledge. Both the arm 29 and weight 30 are located inside the funnel 21 so that rats imprisoned in the forward compartment cannot interfere with the proper operation of the trap door. A handle 32, fixed in the top 11 of the trap, is preferably provided for facilitating the transportation of the trap.

The trap is employed in the following manner:

Assuming a rat hole is found in the floor of a building, the trap is positioned with the front door 12 and the rear door 17 closed in upright position, as indicated in Figure 1, with the bottom opening 35 placed over the rat hole 33. A rat coming out of this hole has no other choice than to enter the funnel 21 and when the animal proceeds in a forward direction along the same he will first land on the trap door 26 which, being delicately balanced by the weight 30 will tip forwardly under the weight of the rat, depositing the animal in the front compartment of the trap. The trap door will then immediately close, actuated by the weight 30 and other rats will then follow in the train of the first so that several of them may be caught at the same time in the trap, the latter being roomy enough to contain a considerable number. It is evident that it makes no difference whether the rats are large or small or merely mice, they will all be caught in the same manner as described.

Should a rat hole be found in the wall of a building, as indicated at 34 in Figure 3, the rear door 17, instead of being disposed in upright position, is swung down to cover the opening 35 in the bottom 10 of the trap and the trap placed with its open rear end against the wall so that the rats will have a free passage into the rear compartment of the trap and climb into the funnel 21 to drop through the trap door 26 into the forward compartment as previously described. The front door 12 is, of course, closed in upright position as shown in the drawings and is only opened after the trap has been removed and the catch drowned in the usual manner, when the rodents may be taken out through the opened front door 12.

Having thus described the invention, what we claim is:

1. A rat trap including a receptacle having end and bottom ingress openings and a single door movable to operative position to close either opening.

2. A rat trap including a receptacle having angularly arranged ingress openings, and a door pivotally mounted on the receptacle and movable to operative position to close either of said openings.

3. A rat trap including a receptacle having communicating ingress openings in its end and bottom walls, and a door pivotally mounted on the receptacle at the junction of said openings and movable to operative position to close either opening while the other remains open.

In testimony whereof we affix our signatures.

MARK TAYLOR. [L. S.]
HUGH G. SOWARD. [L. S.]